May 24, 1955   L. J. MONCRIEFF   2,708,772
METHOD AND APPARATUS FOR EXTRUDING HOLLOW ARTICLES
Filed Aug. 24, 1951

L. J. MONCRIEFF
Inventor

Attorneys

United States Patent Office 2,708,772
Patented May 24, 1955

2,708,772

METHOD AND APPARATUS FOR EXTRUDING HOLLOW ARTICLES

Leslie John Moncrieff, London, England, assignor to British Celanese Limited, a corporation of Great Britain Application August 24, 1951, Serial No. 243,488

Claims priority, application Great Britain August 28, 1950

5 Claims. (Cl. 18—19)

This invention relates to hollow articles and in particular to the production of hollow tubular articles of cellulose acetate or other thermoplastic, and to apparatus for said production.

It is known to form long hollow tubes of roughly cylindrical shape by extruding a hot composition having a basis of cellulose acetate or other thermoplastic, through a die provided with a central core. Hitherto, however, it has been very difficult to obtain throughout the length of said tubes a substantially cylindrical bore of pre-determined diameter. The present invention provides a simple method and apparatus enabling this to be done in the course of an extrusion process. The process of the invention is not confined to the production of tubes of cylindrical cross-section. Long tubes of other section, e. g. elliptical, can be made with a surprisingly close approximation to uniformity of cross-sectional shape and dimensions throughout the whole length of the tube.

Many attempts to obtain accurately cylindrical tubes by solventless extrusion of a thermoplastic such as cellulose acetate have been made. Inflation of the still plastic tube cannot be relied upon to give a cross section of predetermined size and true circularity because air pressure sufficient to prevent distortion at some distance from the die necessarily inflates unduly the more highly plastic part of the tube nearer the die. Even if this difficulty could be overcome there would remain the difficulty of adjusting the pressure to give the predetermined tube size and the virtual impossibility of dealing with any slight variation in the rate of extrusion or the plasticity of the composition. Previous attempts to extrude tubes to predetermined size and shape have, therefore, for the most part involved extruding a tube of smaller diameter than is required, passing this continuously with its production through a jacketed water-cooled finishing die having a bore of diameter equal to the desired external diameter of the tube, and expanding the tube by air pressure so that its outer surface conforms with the inner surface of said die. Attempts to obtain the desired result by this general method have encountered many difficulties. When the finishing die was located some distance along the path of the tubes from the extrusion die, it was found that an air pressure sufficient to expand the tube so that it made contact uniformly with the wall of the finishing die resulted in undesirable inflation in the more readily deformable part of the tube between the two dies. When it was sought to overcome this difficulty by enclosing the space between the two dies, sticking of the fluid material to the enclosing surface occurred. Reduction of the distance between the two dies led to undue cooling of the extrusion die. When the two dies were connected by a short length of heat-insulating material, sticking of the fluid tube to this material occurred. G. Jargstorff and C. Joslin in Modern Plastics, vol. 26, (No. 1), pp. 191–193 and 290, have referred to some of the difficulties encountered and have described an apparatus in which these difficulties are to some extent overcome. In this apparatus a tubular finishing die of the kind already referred to is spaced by a short heat-insulating connection from the extrusion die and is cooled by a water-jacket, the fluid tube is prevented from sticking to the said connection by blowing air into the annular space between the connection and the tube, and is inflated so that its outer surface conforms to the inner surface of the finishing die by a second stream of air. The apparatus is necessarily complex and the authors indicate that very careful pressure control of the two air streams is necessary if the extruded tube is to be prevented both from ballooning out after leaving the finishing die and from expanding back against the extrusion die. The preferred apparatus described by these authors has the further serious disadvantages that the tube, after leaving the finishing die, is still plastic and can therefore undergo change of form and dimensions under the action, for instance, of the tractive force applied or of differential cooling due to air currents. In distinction to these prior processes the process of the invention involves finishing the tube to the desired internal shape and dimensions by drawing it over a shaping device at a point in its path where it is plastic rather than fluid, and immediately cooling it, while still constrained to the shape imposed by the shaping device, to a temperature at which it is rigid rather than plastic. In consequence, during its travel beyond the shaping device it is not liable to be distorted by the tractive force applied or by any differential further cooling that occurs.

In the process of the invention for producing tubes of predetermined cross-sectional shape and size from thermoplastic material, the material is extruded hot through an annular die, the tube so formed is caused to pass while still plastic over a mandrel comprising a shaping member for shaping the inside of the tube to the desired cross-section carried by a stem projecting from the central core of the die, said plastic tube is kept out of contact with the stem by a cushion of gaseous medium and is cooled while in contact with the shaping member so that on passing the said member it retains the shape imparted thereby, and the cooled tube is carried forward by tractive means contacting it beyond the point where it has ceased to be plastic. Thus, along the path of the tubes extruded according to the invention three regions may be distinguished. In the first, extending from the die to where the tube comes into contact with the shaping member (a region in which the tube is highly plastic) relatively slow cooling occurs under little tension, and the tube tends to diminish in bore and increase in thickness. In the second region, where the tube is in contact with the shaping member, under the full tension applied by the draw-off means and with rapid cooling, the shaping occurs, the bore increases and the wall thickness diminishes. The cooling in this region must of course be distinguished from the initial cooling which is generally carried out in hot extrusion by blowing air on to the extruded material from a ring of jets immediately it emerges from the die. After this initial cooling the material is still highly plastic whereas after the strong cooling applied during shaping the tube is no longer plastic but is self-supporting. In the third region, beyond the shaping member, the tension of the draw-off means is transmitted by the relatively cold tube without substantial change in the shape of the tube.

It is important to restrict heat-exchange between the die and the cooling means so as to obtain rapid cooling to a temperature at which the material is no longer plastic during shaping, without unduly cooling the extrusion die. To this end the mandrel stem should be of small cross-sectional area (preferably tubular) to reduce conductivity and may be made of material of low heat-conductivity, and the shaping member should be at some distance from the die. It must not, however, be so far from the die that the tube is no longer highly plastic by the time it reaches the shaping member. The best distance for any particular case must be found by trial as described below. When extruding a cellulose acetate moulding composition into tubing 2" in diameter and 0.02" thick under the conditions which are normal for such extrusion, (the tube being as is usual cooled immediately after emerging from the die by a ring of air jets to a temperature at which it is still highly plastic) we have obtained satisfactory results with a distance of about 18" from the die-face to the shaping member. When smaller and/or thinner tubes are being extruded the best distance will be less, e. g. for a tube of ¾" diameter and 0.01" thick a suitable distance is about 8".

In the first region the tube is prevented from making contact with the mandrel-stem by maintaining a cushion of air or other gaseous medium between the tube and the stem. In this way collapse of the tube and sticking to the mandrel-stem are avoided. The preferred form of apparatus according to the invention provides means for obtaining the desired cushion effect by maintaining a stream of air under pressure between the mandrel-stem and the tube behind the shaping member. The air is preferably introduced through symmetrically disposed holes in the stem communicating with a passage in the stem connected to the air supply. It is vented through holes in the shaping member into the tube beyond the shaping member. The shaping member may be substantially cylindrical the rear end being dished to provide an easy approach for tube into contact with the shaping surface and being perforated by the air-vents, the forward end being open so that the vented air can escape freely into the tube beyond the shaping member. This air stream besides holding the tube out of contact with the mandrel may help in cooling the tube from the fluid state to the plastic state which is required at the beginning of the final shaping operation. For this purpose pre-cooled air may be used. The air, however, may be at atmospheric temperature or even above atmospheric.

There is a tendency for the tube to stick while being drawn over the shaping device and this tendency must naturally be reduced as far as possible. One factor likely to cause sticking if not allowed for is the shrinkage of the tube during cooling. To allow for this, the forward part of the shaping member should be of slightly smaller diameter than the rear part. The shaping surface may, for instance, be truly cylindrical along the first part of its length and may then taper slightly to a diameter equal to that of the cooled tube. The nature of the shaping surface is also important. Although this may be highly polished or plated and polished we have found a matt surface obtained for example by etching or sand blasting to be preferable. A brass mandrel for instance can be suitably etched by immersion in dilute nitric acid. In addition to attending to these factors in the construction of the shaping member, however, some lubrication of the inside of the tube in contact with the shaping member has usually been found necessary. One method of doing this is to introduce a liquid lubricant into the annular space between the stem and the tube. The lubricant can, for instance, be atomized into the air fed into this space. Or the air can be charged with lubricant by being bubbled through a body of lubricant. As lubricants non-drying vegetable oils such as olive oil and castor oil, and mineral oils, have been found effective. A further alternative is a non-thermosetting silicone polymer. Plasticisers, provided they do not render the material sticky, e. g. non-solvent plasticisers such as tricresyl phosphate, may also be used. In addition to or as an alternative to introducing a liquid lubricant into the tube the shaping surface may be of material having lubricating properties. The surface may for instance be composed of a metal in porous form charged with lubricant such as is used for self-lubricating bearings. Or a rigid material, e. g. polytetrafluoroethylene, having lubricating properties in the absence of added lubricant can be used. The shaping member may be formed to a shape suitable for attachment to a metal stem and drilled with the necessary holes for venting the air from the annular space between stem and tube.

The cooling occurring in the second region should be very rapid so that during passage over the shaping surface the tube is cooled from the plastic to the substantially rigid condition. No cooling agent as effective as water for this purpose has been found. Other liquids that could be used, apart from their expense, compare unfavourably with water in respect of specific heat and latent heat of evaporation. With air or other gaseous medium, even when cooled with solid carbon dioxide, it is difficult to cool the tube sufficiently to prevent stretching under the action of the draw-off means after leaving the shaping device. Preferably the cooling is effected by spraying water directly on to the tube. Where the tube first enters the cooling zone the velocity of the spray must be carefully controlled to avoid damaging the still soft tube. As the tube progresses through the cooling zone, however, it becomes harder and less liable to be damaged even by a spray of high momentum, and so the velocity of the spray can be progressively increased along the path of the tube. A very fine spray such as is delivered by a spray gun may be used, especially at the beginning of the second zone. The cooling water may contain a wetting agent such, for example, as those used in the process of U. S. application Ser. No. 152,759, filed March 29, 1950, now Patent 2,597,098, granted Nov. 20, 1952.

The tractive force necessary to draw the tube over the mandrel may be applied by one or more pairs of rolls, the upper and lower rolls of each pair co-operating to grip the tube, the rolls being so situated that the tube has become rigid before reaching them. The rolls may be cylindrical, or profiled so that each grips the tube round an arc instead of making substantially point-contact. If the rolls are profiled they must be very accurately aligned to avoid rotating the tube. Quite adequate grip can be obtained with cylindrical rolls covered with rubber or other resilient material. One roll of each pair may be positively driven, the other roll being spring-loaded and driven by frictional contact with the tube. The positively driven rolls of each pair are all driven at the same speed, preferably through a drive incorporating an infinitely variable gear. Such a gear enables the speed to be adjusted during starting, and when dealing with any variations in extrusion. Suitable supporting means for the tube, e. g., one or more driven or idle supporting rolls, may be provided between the shaping member and the draw-off rolls. Other forms of draw-off means may be used, e. g. a belt driven through infinitely variable gear co-operating with an upper idler roll pressing the tube on to the belt. The draw-off means may feed the tube to means for cutting it into lengths. It is generally preferable to operate the draw-off means at such a speed as to stretch the tube somewhat (e. g. by 10 to 30%) between the die and the shaping member.

By way of example apparatus according to the invention is illustrated in the accompanying diagrammatic drawings wherein.

In these drawings the change in diameter from the stem-part of the mandrel to the expanded part constituting the shaping member is shown as much more abrupt than is generally desirable in practice.

Figure 1:
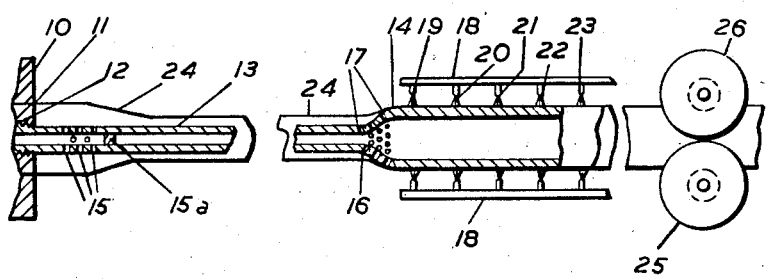
Fig. 1 shows in part sectional elevation the general layout of the apparatus.

Referring to Fig. 1, reference numeral 10 represents the die face of an annular die having a die aperture 11 and a central core 12. This die is fitted to a screw-extruder (not shown) of the kind commonly used in the solventless extrusion of cellulose acetate tubes. Just beyond the die face is the usual ring of air jets (not shown) for initially cooling the tube as described above. Into the core 12 is screwed a hollow mandrel 13 terminating in an open-ended expanded part 14 constituting the shaping member. The outer surface of this expansion owing to the scale of the drawing has been shown as cylindrical. Actually, however, there is a very slight taper (0.008 in 1) from a point about half way (e. g. three-sevenths of the way) along the surface, measured from the open end of the expansion, to the open end. This allows for shrinkage of the tube on cooling. For making tubes of diameter 2" and thickness 0.009", for instance, a mandrel has been used in which the shaping member (situated 15" from the die-face) is cylindrical at a diameter of 2.004" for a distance of 1" from the shoulder and then tapers for a distance of 2.5" to a diameter of 2.00" at the open end. At a short distance (e. g. 2" to 3") along the mandrel-stem from the die face is a series of air outlet holes 15 beyond which the tube is closed by a plug 15a. In the immediate neighbourhood of the shoulder 16 of the expanded part of the mandrel is a further series 17 of air inlet holes. The hollow mandrel extends back through the extruder and is connected at a convenient position with an air supply pipe (this and the backward projecting part of the mandrel are not shown). The shaping device formed by the expanded part of the mandrel is surrounded by a series of water-spray pipes of which two are shown at 18. Each of these pipes has a series of nozzles 19, 20, 21, 22 and 23 adapted to direct a spray of water on to the thermoplastic tube 24 which is extruded through the die aperture 11 and drawn over the mandrel by take-off rolls 25 and 26. Several successive pairs of take-off rolls 25 and 26, of which one pair only is shown, are used. As shown, both upper and lower rolls are deeply recessed to grip the tube but as stated above, cylindrical rolls can be used and need less careful alignment. The lower rolls 25 of each pair are driven at the same speed through infinitely variable gear (not shown). The upper rolls 26 are spring loaded and driven by the tube. Preferably the water jets 19 to 23 are independently controllable by valves (not shown) that can be adjusted so that the velocity of the jets increases along the path of the extruded tube.

The operation of the apparatus will now be described.

A moulding powder comprising, for instance, cellulose acetate plasticised with diethyl phthalate, di-(methoxy ethyl)-phthalate or a mixture of dimethyl phthalate and triphenyl phosphate in the ratio of 4:1 is fed to the extruder and the temperature of extrusion is controlled at a value much lower than that used in normal extrusion so that the tube extruded is plastic rather than fluid and has little tendency to stick to the mandrel 13. Air is supplied to the interior of the mandrel, emerges through the holes 15 into the annular space between the outside of the mandrel and the inside of the extruded tube 24 and leaves this space through the holes 17, after which it passes from the open end of the mandrel into the extruded tube. The air in the said annular space keeps the wall of the tube from contacting the mandrel until the expansion 14 is reached. When the tube is extruded at a low temperature as described it can easily be drawn over the expansion 14 of the mandrel until engaged by the draw-off rolls 25 and 26 which are set in motion so as to continue drawing-off the tube as it is extruded. The temperature of extrusion is now gradually increased until the tube is being extruded in a fluid condition. Meanwhile the air passing through the mandrel is so regulated as just to prevent sticking of the tube to the mandrel without inflating it unduly. The water jets are operated so that a light spray falls on that part of the tube which is hottest and might be damaged by a high velocity jet, while further along the path of the tube the water velocity becomes progressively greater, so that by the time the tube leaves the expansion of the mandrel it is substantially non-plastic and can sustain the tension applied by the draw-off rollers without stretching.

Figure 2:
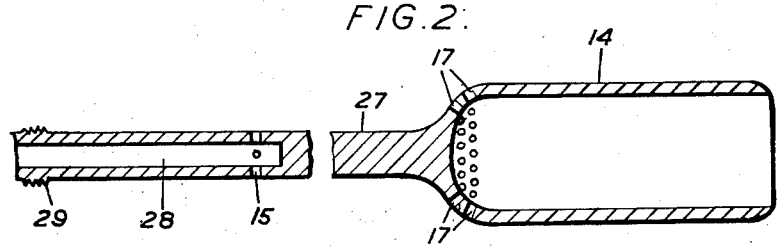
Fig. 2 is a detailed drawing in sectional elevation of one form of mandrel according to the invention and Fig. 3 shows in sectional elevation part of an adjustable mandrel according to the invention.

Referring now to Fig. 2 this shows an alternative form of mandrel, the stem 27 of which, carrying the expansion 14, is a solid rod having a bore 28 extending only a short distance beyond the air outlet 15. This is a very convenient form of construction for mandrels for extruding tubes of small diameter, for example up to one inch internal diameter. The mandrel is threaded at 29 to screw into the plug 12 of the die.

Figure 3:
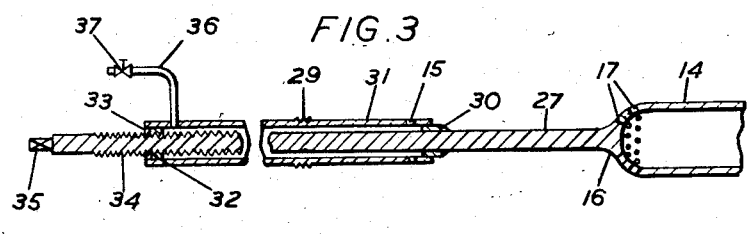

Fig. 3 shows a mandrel in which the distance between the air outlet holes 15 and the air inlet holes 17 is adjustable. The stem part 27 of this mandrel, bearing the expansion 14 provided at the shoulder 16 with air inlet holes 17, is a sliding fit in a plug 30 which is fixed in a tube 31 threaded at 29 for screwing into the core 12 of the die, and having air outlet holes 15. The tube 31 projects backwards right through the extruder and its rearward end is closed by a plug 32 internally threaded at 33 to take a threaded portion 34 of the stem 27 of the mandrel. A square 35 is provided on the rearward end of the stem 27 whereby it can be turned so as to advance or retract the expansion 14. An air inlet pipe 36 provided with a valve 37 admits air to the annular space between the stem 27 and the tube 31.

The use of an adjustable mandrel facilitates determination of the best distance apart of the air outlet holes and the air inlet holes when setting up for the production of tubing of particular dimensions from a given thermoplastic composition for the first time.

It is of advantage to be able to vary at will the relative total areas of air inlet and air outlet holes. This can be done by providing in a hollow mandrel of the kind shown in Fig. 1 a closely fitting rotatable internal sleeve having corresponding perforations to the air outlet holes 15, the arrangement being such that this internal sleeve can be rotated from a position in which its holes register with the holes 15 to a position in which the two sets of holes are completely out of register so that no air can pass through the holes 15. This arrangement enables, for instance, more air to be supplied to the annular space between the extruded tube and the mandrel in starting than is required once the plant is running. With a view to minimising cooling of the extrusion die the air holes 15 should not be unduly close to the jet face; they may with advantage be at a distance of several inches therefrom. With the same object in view the stem part of the mandrel may be made of material of poor thermal conductivity, for example ebonite. It will be appreciated that when extrusions of other than circular section are required, for example extrusions of elliptical or polygonal section, the expansion of the mandrel must be modified to the desired internal shape and dimensions. The apparatus is shown in the drawings as arranged for horizontal extrusion but this is not necessary. The apparatus can be arranged for instance for extrusion vertically upwards or downwards.

A mandrel having a stem portion with air outlet holes and an expanded open-ended portion with holes for the readmission of air is believed to be one of the broadly novel features of the invention. The principle of causing air to pass along the annular space between the tube and a mandrel and then to pass through the mandrel into the tube is also believed to be broadly novel. Other novel features of the invention include: determining the final shape and dimensions of the tube by means of an internal shaping device situated in a region in which the tube is plastic rather than fluid; and cooling the tube so rapidly that it is substantially rigid on leaving the shaping device.

According to a modification of the invention as described above, the process is carried out as described but the cooling while the tube is being shaped is insufficient to render the tube leaving the shaping device non-plastic. It can therefore be stretched to some extent by the draw-off means after leaving the shaping member. In this way tubes can be obtained having the shape imparted by the shaping member but having a smaller cross-sectional area. Whether this area remains constant over a long length of finished tube depends on whether the speed of draw-off and the speed of extrusion can be kept constant. For some purposes, e. g. for display purposes, tubes of circular cross-section even where this is neither uniform nor predetermined, are of more value than tubes of the far from regular cross-section obtained by normal extrusion.

The invention has been described with particular reference to the extrusion of tubes having a basis of cellulose acetate. The process and apparatus of the invention, however, can be employed with advantage in the extrusion of tubular articles having a basis of other thermoplastics, for example other thermoplastic cellulose derivatives such as cellulose propionate, cellulose acetate-propionate, cellulose acetate-butyrate, ethyl cellulose and benzyl cellulose; solid polymers and copolymers of ethylene; thermoplastic polyvinyl compounds, such as polystyrene, and copolymers of vinyl chloride with a minor proportion of vinyl acetate, of vinylidene chloride with a minor proportion of vinyl chloride, and of vinyl chloride or vinylidene chloride with acrylonitrile or methacrylonitrile; thermoplastic polymers of acrylic acid derivatives, for example polyethyl acrylate and polymethyl methacrylate; and thermoplastic linear condensation polymers such as the nylons, polyethylene terephthalate and poly-4-amino-1.2.4-triazoles. It will be understood that to obtain the desired predetermined dimensions in the tubes obtained the thermoplastic material should be substantially rigid at ordinary atmospheric temperature so that before leaving the shaping member it can be cooled to a temperature at which its dimensions do not change under the stress applied by the draw-off means. Cellulose esters derived from carboxylic acids containing 2 to 4 carbon atoms, and especially cellulose acetate, are particularly suitable.

Having described my invention, what I desire to secure by Letters Patent is:

1. In a process for the production of rigid tubes by continuously extruding hot, thermoplastic material into tubular form, cooling the extruded tube and drawing it away from the extrusion point by tractive means contacting it only in a region in which it is no longer plastic, the steps which comprise: controlling the cross-sectional shape and size of the tube by drawing it over a shaping member contacting the inside of the tube in a zone between and separated from said point and said region; supporting the tube between said point and said region solely by means of said shaping member, the shaping member being rigidly supported within said zone and being of such shape and dimensions that the greatest area bounded by the perimeter of any transverse section of the shaping member is less than the internal area of the tube at the extrusion point; rapidly cooling the tube from the plastic to the non-plastic condition within said zone; continuously introducing air into the tube behind the shaping member and causing it to pass through a passage in said member and thence through the tube in front of said member.

2. Process according to claim 1, wherein the area of contact between the shaping member and the tube is substantially cylindrical.

3. Process according to claim 1, wherein the thermoplastic material extruded is a plasticized cellulose derivative selected from the class consisting of cellulose acetate, cellulose propionate, cellulose butyrate, cellulose acetate-propionate, cellulose acetate-butyrate and ethyl cellulose.

4. In apparatus for producing rigid tubes by extruding hot thermoplastic material in the absence of volatile liquids and continuously drawing off and cooling the extruded tube, the combination of: an annular extrusion die; means for continuously drawing away from the die a tube extruded therefrom, said means being spaced away from the die so that the tube can be cooled to a temperature at which it is no longer plastic before being contacted by said drawing means; and a mandrel comprising a stem carried by the central core of the die and a shaping member carried by said stem, said shaping member serving as the sole support for the tube between the die and the drawing means and serving also to control the shape and size of the tube by contacting the inside of the tube over a small part of its path towards the drawing means, the shape and size of the shaping member being such that the greatest area bounded by the perimeter of any transverse section through said member is less than the area bounded by the external diameter of the die core at the die face, the shaping member being perforate to allow air to pass from the part of the tube behind it to the part of the tube in front of it, and the mandrel stem being provided with a passage for introducing air into the tube behind the shaping member.

5. Apparatus according to claim 4, wherein the shaping member has a substantially cylindrical shaping surface of diameter less than the external diameter of the die core at the die face.

References Cited in the file of this patent

UNITED STATES PATENTS

| 1,196,648 | Bleecker | Aug. 29, 1916 |
| 1,544,255 | Maynard | June 30, 1925 |
| 1,601,686 | Henderson | Sept. 28, 1926 |
| 1,740,029 | Moomy | Dec. 17, 1929 |
| 2,317,687 | Larchar | Apr. 27, 1943 |
| 2,423,260 | Slaughter | July 1, 1947 |
| 2,433,937 | Tornberg | Jan. 6, 1948 |